United States Patent
Towster et al.

(10) Patent No.: US 8,699,348 B2
(45) Date of Patent: *Apr. 15, 2014

(54) METHODS AND APPARATUS TO CONTROL TRAFFIC IN A PACKET-SWITCHED NETWORK

(71) Applicant: AT&T Intellectual Property I, LP, Atlanta, GA (US)

(72) Inventors: Henry Towster, Barrington, IL (US); Juan Nunez, McKinney, TX (US); Nikhil Marathe, Chicago, IL (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,708

(22) Filed: Nov. 29, 2012

(65) Prior Publication Data

US 2013/0088964 A1  Apr. 11, 2013

Related U.S. Application Data

(63) Continuation of application No. 11/838,015, filed on Aug. 13, 2007, now Pat. No. 8,335,162.

(51) Int. Cl.
*H04L 1/00* (2006.01)
*H04L 12/56* (2006.01)

(52) U.S. Cl.
CPC .................................. *H04L 47/127* (2013.01)
USPC ........................................... 370/237; 370/252

(58) Field of Classification Search
CPC ...... H04L 47/12; H04L 47/122; H04L 47/127
USPC .......... 370/229–235, 237, 241, 248, 250, 252
See application file for complete search history.

(56) References Cited

U.S. PATENT DOCUMENTS

| 4,669,113 A | 5/1987 | Ash et al. |
| 4,905,233 A | 2/1990 | Cain et al. |

(Continued)

OTHER PUBLICATIONS

Cisco, "IGRP Metric," Document ID:13678, Jun. 15, 2006, 5 pages.

(Continued)

*Primary Examiner* — Hassan Kizou
*Assistant Examiner* — Ashil Farahmand
(74) *Attorney, Agent, or Firm* — Hanley, Flight & Zimmerman, LLC (57) ABSTRACT

Methods and apparatus to control traffic in a packet-switched network are disclosed. An example circuit manager includes a usage analyzer to estimate a utilization of a network for a future time interval based on data associated with actual utilization of the network, a rebalancer to detect a trigger event based on the estimated utilization, and to identify a future virtual circuit path through the network for the future time interval based on the estimated utilization when the trigger event is detected, the usage analyzer and the rebalancer to repetitively change mapping of virtual circuit paths including the future virtual circuit path to physical resources to adapt the network to expected usage conditions, a rerouter to identify the future virtual circuit path based on a first predicted weighted cost for a first communication link and a second predicted weighted cost for a second communication link, and a capacity manager to determine whether the identified future virtual circuit path is expected to reduce a future utilization of a communication path below a first threshold, and to determine where additional transmission capacity should be added to the network when the predicted future utilization of the communication path exceeds the first threshold.

20 Claims, 6 Drawing Sheets

(56) References Cited

U.S. PATENT DOCUMENTS

| | | | |
|---|---|---|---|
| 5,042,027 | A | 8/1991 | Takase et al. |
| 5,408,465 | A | 4/1995 | Gusella et al. |
| 6,477,143 | B1 | 11/2002 | Ginossar |
| 6,725,263 | B1 | 4/2004 | Torres |
| 6,842,463 | B1 | 1/2005 | Drwiega et al. |
| 6,850,524 | B1 | 2/2005 | Troxel et al. |
| 7,088,677 | B1 | 8/2006 | Burst, Jr. |
| 7,149,185 | B1 | 12/2006 | Suni |
| 7,673,057 | B1 * | 3/2010 | Yip et al. ............ 709/229 |
| 8,009,575 | B1 * | 8/2011 | Spain et al. ........... 370/252 |
| 2002/0133589 | A1 | 9/2002 | Gubbi et al. |
| 2002/0191250 | A1 | 12/2002 | Graves et al. |
| 2002/0194251 | A1 | 12/2002 | Richter et al. |
| 2003/0198235 | A1 | 10/2003 | Weldon et al. |
| 2004/0001497 | A1 | 1/2004 | Sharma |
| 2005/0052992 | A1 | 3/2005 | Cloonan et al. |
| 2005/0234937 | A1 | 10/2005 | Ernest et al. |
| 2006/0007858 | A1 | 1/2006 | Fingerhut et al. |
| 2006/0023638 | A1 | 2/2006 | Monaco et al. |
| 2006/0067213 | A1 | 3/2006 | Evans et al. |
| 2006/0140119 | A1 | 6/2006 | Yeh et al. |
| 2006/0164978 | A1 | 7/2006 | Werner et al. |
| 2006/0227706 | A1 | 10/2006 | Burst, Jr. |
| 2006/0239184 | A1 | 10/2006 | Moore |
| 2008/0182572 | A1 | 7/2008 | Tseytlin et al. |
| 2009/0046583 | A1 | 2/2009 | Towster et al. |

OTHER PUBLICATIONS wikipedia.org., "Enhanced Interior Gateway Routing Protocol," May 18, 2006, 3 pages.

Cisco, "Cisco CNS Performance Engine," retrieved from, http://www.cisco.com/univercd/cc/td/doc/product/rtrmgmt/cnspe/index.htm, on Feb. 4, 2008, 1 page.

Cisco, "Cisco Performance Engine User Guide, 2.1.5-System Overview," retrieved from, http://www.cisco.com/en/US/docs/net_mgmt/performance_engine/2.1.5/user/guide/CNSPEU1.html, on Feb. 4, 2008, 6 pages.

SBC OPT-E-MAN Solutions, "Optical Ethernet Networking Solutions," Jan. 10, 2005, 15 pages.

Cisco, "Cisco Multiservice Packet Network Solution Overview—Solution Management," Retrieved from, http://www.cisco.com/en/US/products/hw/univgate/ps505/products_implementation_design_guide_chapter09186a, on Jun. 26, 2007, 8 pages.

United States Patent and Trademark Office, "Notice of Allowance," issued in connection with U.S. Appl. No. 11/838,015, mailed Aug. 16, 2012, 24 pages.

United States Patent and Trademark Office, "Final Office Action," issued in connection with U.S. Appl. No. 11/838,015, mailed Jul. 28, 2010, 35 pages.

United States Patent and Trademark Office, "Non-Final Office Action," issued in connection with U.S. Appl. No. 11/838,015, mailed Mar. 12, 2010, 31 pages.

United States Patent and Trademark Office, "Non-Final Office Action," issued in connection with U.S. Appl. No. 11/838,015, mailed Aug. 31, 2009, 42 pages.

* cited by examiner

METHODS AND APPARATUS TO CONTROL TRAFFIC IN A PACKET-SWITCHED NETWORK

CROSS REFERENCE TO RELATED APPLICATION

This patent is a continuation of and claims priority to U.S. application Ser. No. 11/838,015, filed Aug. 13, 2007, entitled "Methods and Apparatus to Control Traffic in a Packet-Switched Network," which is hereby incorporated herein by reference in its entirety.

FIELD OF THE DISCLOSURE

This disclosure relates generally to packet-switched networks and, more particularly, to methods and apparatus to control traffic in a packet-switched network.

BACKGROUND

In many packet-switched networks, data paths between two endpoints (e.g., customer locations) are defined by so-called "virtual circuits." To facilitate routing of data based on virtual circuits, data packets include a virtual circuit identifier (VCID) field. The physical communication path through the packet-switched network used to transport a particular virtual circuit is defined by one or more nodes (e.g., switches, and/or routers) and/or one or more inter-nodal communication links. Routing tables are defined for and/or provided to the nodes such that, when data associated with a given virtual circuit is received, the nodes can determine to which node (and/or via which communication link) the data is to be forwarded. An example virtual circuit routing algorithm defines routing tables by choosing between similar cost communication paths using a round-robin selection method.

DETAILED DESCRIPTION

Methods and apparatus to control traffic in a packet-switched network are disclosed. A disclosed example circuit manager includes a probe interface to collect data representative of actual utilization of a network, a usage analyzer to estimate a utilization of the network for a future time interval based on the collected data, and a rebalancer to detect a trigger event based on the estimated utilization, and to automatically identify a future virtual circuit path through the network for the future time interval based on the estimated utilization when the trigger event is detected; wherein the probe interface, the usage analyzer and the rebalancer operate repetitively to route data in the network in response to actual data transmissions.

A disclosed example method includes: (a) collecting data representative of actual utilization of a network, (b) detecting a trigger event, (b1) responsive to the trigger event, automatically estimating a utilization of the network for a future time interval based on the collected data, (b2) identifying a future virtual circuit path through the network for the future time interval based on the estimated utilization, (b3) storing the future virtual circuit path in a routing table, and (c) repeating (a), (b), (b1), (b2) and (b3) to control traffic in the network in real-time.

In the interest of brevity and clarity, throughout the following disclosure references will be made to the example packet-switched communication system of FIG. 1. Moreover, the following disclosure will reference controlling traffic in the example packet-switched communication system by adaptively routing virtual circuits (e.g., adaptively selecting and/or assigning physical communication paths through the packet-switched communication system to the virtual circuits). However, it should be understood that the methods and apparatus described herein to control traffic are applicable to other communication systems and/or networks.

Figure 1:
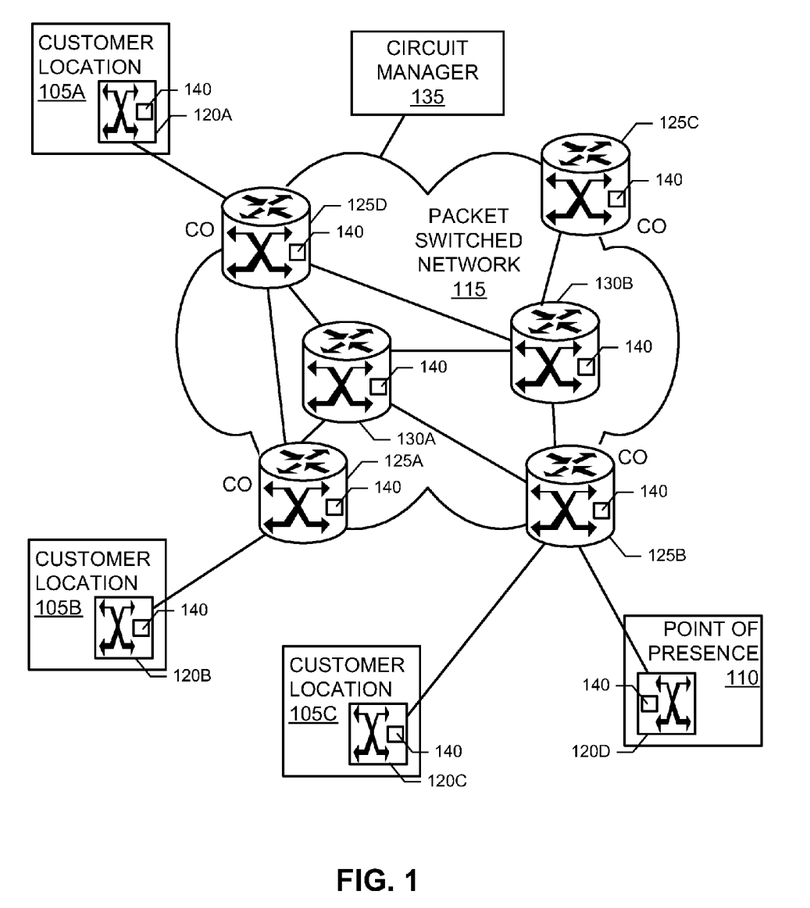
FIG. 1 is a schematic illustration of an example packet-switched communication system constructed in accordance with the teachings of the disclosure.

FIG. 1 is a schematic illustration of an example packet-switched communication system to provide one or more data communication services (e.g., a transparent local area network (TLAN) service, a virtual local area network (VLAN) service, a dedicated internet access (E-DIA) service, a virtual private local area network service (VPLS)) throughout and/or within a site, a location, a building, a city, a metropolitan area, a geographic area and/or a geographic region. The example packet-switched communication system provides and/or facilitates data communication services between and/or amongst any number and/or type(s) of customer locations (three of which are designated at reference numerals 105A, 105B and 105C) and/or any number and/or type(s) of point of presence (POP) locations (one of which is designated at reference numeral 110). For example, a first VLAN can be implemented amongst the customer locations 105A-C, with a second VLAN implemented between the customer location 105C and the POP location 110. To transport data between the example customer locations 105A-C and/or the example POP location 110, the example packet-switched communication system of FIG. 1 includes any number, type(s) and/or topology(-ies) of packet-switched networks, one of which is designated at reference numeral 115.

To communicatively couple the example customer locations 105A-C and the example POP location 110 to the example packet switched network 115, each of the example customer locations 105A-C and the POP location 110 includes and/or implements one or more packet-based switches (four of which are designated in FIG. 1 with reference numerals 120A, 120B, 120C and 120D). An example switch 120A-D is a switch from the Catalyst 3000 and/or 5000 series of switches from Cisco Systems, Inc. One or more user devices (not shown) may be communicatively coupled to the example switches 120A-D, and used to access and/or utilize data communication services provided and/or implemented by the example packet-switched communication system of FIG. 1.

The example switches 120A-D are communicatively coupled to the packet-switched network 115 via an associated edge router (four of which are designated in FIG. 1 with reference numerals 125A, 125B, 125C and 125D). The example edge routers 125A-D of FIG. 1 are located at, for example, central office (CO), vault, and/or remote terminal locations. An example edge router 125A-D is a router from the 7500 series of routers from Cisco Systems, Inc. As illustrated in FIG. 1, more than one of the customer locations 105A-C and/or the POP location 110 can be coupled to the same edge router 125A-D. The example switches 120A-D are communicatively coupled to the example edge routers 125A-D via any type(s) and/or number of access device(s), communication technology(-ies), communication link(s) and/or communication network(s) such as, for example, public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

To transport data between the example edge routers 125A-D, the example packet-switched network 115 of FIG. 1 includes one or more internal routers, two of which are designated in FIG. 1 with reference numerals 130A and 130B. An example internal router 130A-B is a router from the 7500 series of routers from Cisco Systems, Inc. The example routers 125A-D and 130A-B are communicatively coupled via physical communication paths and/or links that allow data to be transported between the edge routers 125A-D and/or, more generally, between and/or amongst the example customer locations 105A-C and/or the example POP location 110.

Data is routed between the example customer locations 105A-C and/or the example POP location 110 based on virtual circuits. In general, a virtual circuit represents a logical communication path between a first device (e.g., the switch 120A) to a second device (e.g., the switch 120C). Virtual circuits can also be defined to logically connect more than two devices (e.g., in a point-to-multipoint configuration). To send data via a virtual circuit, transmitted data is flagged with a virtual circuit identifier (VCID) (e.g., by storing the VCID within a packet header field). Devices receiving the data (e.g., a router 125A-D and/or 130A-B) use the VCID to determine how to route the data to the correct destination(s). For example, an edge router 125A-D receiving data associated with a particular virtual circuit, queries its routing table based on an identified VCID to determine to which device (e.g., another router 125A-D and/or 130A-B, and/or a customer location 105A-C and/or POP location 110) the data is to be forwarded and/or transmitted, and/or via which physical communication link the data is to be forwarded and/or transmitted. The routing tables implemented by the example switches 120A-D and/or the example routers 125A-D and/or 130A-B associate each virtual circuit with a particular physical route through the packet-switched communication system.

To adaptively assign physical routes through the example packet-switched communication system of FIG. 1 to virtual circuits, the example packet-switched communication system includes a circuit manager 135. Based on measurements, data and/or information collected, compiled and/or aggregated by the example switches 120A-D and/or the example routers 125A-D and/or 130A-B, the example circuit manager 135 adapts the assignment of virtual circuits to physical communication resources (e.g., switches and/or physical communication paths) to satisfy one or more criteria. Example criteria include, but are not limited to, balancing the load of the communication paths and/or links coupling the switches and routers 120A-D, 125A-D and/or 130A-B, reducing the cost(s) associated with one or more communication paths and/or links, and/or reducing the cost(s) associated with one or more virtual circuits. As used herein, the term "cost" need not represent the monetary cost associated with operating a communication path, communication link and/or virtual circuit. Cost can, additionally or alternatively, be representative of how well a communication path, communication link and/or virtual circuit is operating and/or is predicted to operate (e.g., how well the virtual circuit is operating relative to a service level agreement (SLA) associated with the virtual circuit). For example, cost can represent the state (e.g., amount) of jitter and/or latency a communication path, communication link and/or virtual circuit is currently experiencing, has been experiencing and/or is expected to experience, and/or a historical, current and/or expected packet delivery rate. An example manner of implementing the example circuit manager 135 of FIG. 1 is described below in connection with FIG. 2.

The example circuit manager 135 of FIG. 1 continually (e.g., at periodic and/or aperiodic scheduled intervals, and/or in response to particular events): a) collects current and/or historical communication path and/or link load information and/or data, and/or cost information and/or data, b) estimates future loads (e.g., a peak busy hour for a particular communication link and/or path, and/or virtual circuit) and/or costs based on the collected information and/or data, and c) uses the estimated loads and/or costs to determine whether to reroute one or more virtual circuits (e.g., by comparing the estimated loads and/or costs to one or more thresholds). If the example circuit manager 135 determines that a particular virtual circuit should be assigned to a different route through the packet-switched network 115, the circuit manager 135: i) selects the different route (e.g., by selecting a route with a lower load and/or cost), and ii) updates the routing tables of the switches 120A-D and/or the routers 125A-D and/or 130A-B to begin routing the virtual circuit via the new route (e.g., updates the routing table of one or more of the switches 120A-D and/or the routers 125A-D and/or 130A-B).

By monitoring the loads and/or costs associated with the packet-switched communication system, the example circuit manager 135 is able to adaptively control traffic in the packet-switched network 115 to reduce communication path, communication link and/or virtual circuit costs, and/or to adaptively maximize the throughput of the packet-switched communication system during peak usage time periods. For example, if based on historical usage data, the circuit manager 135 predicts that a particular virtual circuit will transport more data during the coming one hour period it, thus, reassigns the virtual circuit and/or one or more other virtual circuits to different physical routes for the expected busy time period. By reassigning the virtual circuit(s), the circuit manager 135 can improve the likelihood that communication paths, communication links and/or virtual circuits have acceptable cost(s) and/or load(s) during the expected busy time period. When the expected busy time period is over, the circuit manager 135 may reconfigure the packet-switched network 115 to the previous virtual circuit assignments and/or, based on additional predicted loads and/or costs, makes one or more different virtual circuit reassignments. The example circuit manager 135 also monitors cost and/or loads to determine when virtual circuit reassignments will no longer be sufficient to control costs and/or loads and, thus, additional capacity needs to be added to the packet-switched network 115.

In contrast, traditional methods to assign a virtual circuit to a physical route are performed only once when the virtual circuit is first provisioned. Moreover, traditional methods select physical routes in a round-robin fashion and do not seek to balance the collective load(s) and/or cost(s) associated with a packet-switched communication system. Further, the costs and/or loads of the packet-switched communication system are not monitored and/or used to automatically adapt the assignment of virtual circuits to physical routes. For at least these reasons, traditional virtual circuit assignment methods result in the inefficient utilization of packet-switched networks, in the unnecessary deployment of additional switches, in the unnecessary construction of excess communication paths and/or links simply to handle busy time periods, and/or result in higher costs.

To collect data regarding communication path, communication link and/or virtual circuit loads and/or costs, one or more of the example switches 120A-D and/or the routers 125A-D and/or 130A-B implement any number and/or type(s) of SLA probes 140. As data flows through the example packet-switched communication system of FIG. 1, the example SLA probes 140 collect data regarding, for example, the number of transmitted packets, jitter and/or latency for the various applications, virtual circuits, communication paths and/or communication links. The example SLA probes 140 aggregate the data collected over a time period (e.g., a fifteen minute time period), and provide the aggregated data to the example circuit manager 135. Example aggregated data represents the bandwidth utilized by particular applications, and/or loads and/or costs of the virtual circuits, communication paths and/or communication links during the time period. Example SLA probes 140 are the Cisco Network Service (CNS) Notification Engine (CNOTE) and CNS performance engine (CNSPE) from Cisco Systems, Inc. Example data structures that may be used by the SLA probes 140 to provide the load and/or cost information and/or data to the circuit manager 135 are described below in connection with FIGS. 4 and 5.

Figure 2:
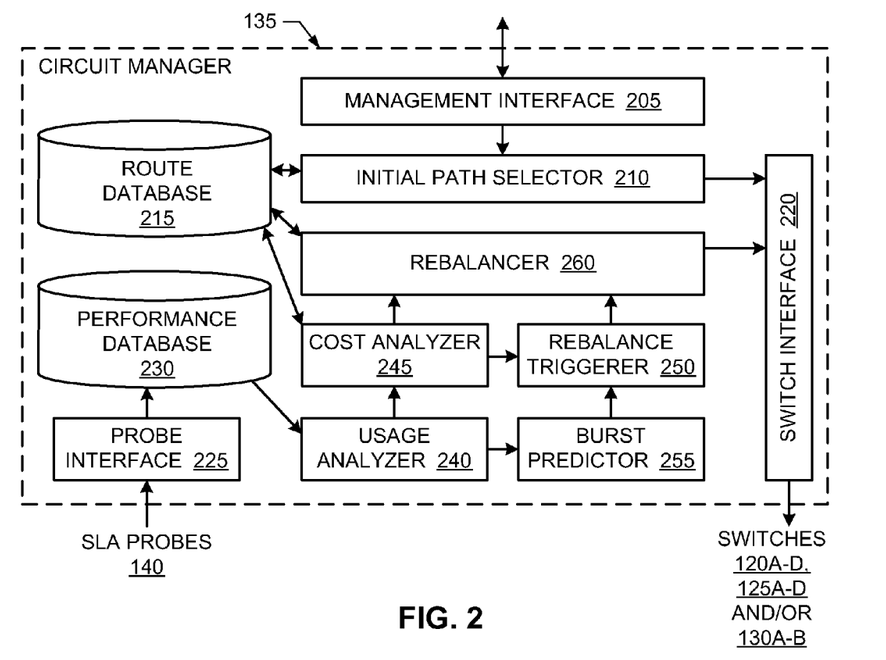
FIG. 2 illustrates an example manner of implementing the example circuit manager of FIG. 1.

FIG. 2 illustrates an example manner of implementing the example circuit manager 135 of FIG. 1. To allow the example circuit manager 135 of FIG. 2 to be managed, configured and/or controlled, the example circuit manager 135 includes a management interface 205. The example management interface 205 of FIG. 2 allows, for example, an operations and support system (OSS) server and/or a user terminal (not shown) to, among other things, specify a new virtual circuit, specify characteristics and/or parameters (e.g., originating endpoint, terminating endpoint, provisioned bandwidth, SLA parameters, etc.) for new and/or existing virtual circuits, review and/or receive reports concerning the current and/or historical performance of a packet-switched network, and/or obtain service tickets concerning additional capacity to be added to a packet-switched network.

To select an initial path for a new virtual circuit (e.g., between endpoints A and B), the example circuit manager 135 of FIG. 2 includes an initial path selector 210. The example initial path selector 210 of FIG. 2 queries a database of routes 215 to determine whether the new virtual circuit is encompassed by an existing communication path (e.g., by a communication path between endpoints A and C, where endpoint B is communicatively located between endpoints A and C). If the new virtual circuit is part of an existing path, then the initial physical route for the new virtual circuit is selected based on the existing path. If the new virtual circuit is not part of an existing path, then an initial physical route for the new virtual circuit is selected by applying any suitable route selection algorithm, such as a round-robin selection method. Once a physical route for the new virtual circuit is selected, the example initial path selector 210 of FIG. 2 updates the example route database 215, and indicates to a switch interface 220 that updated routing information and/or data is available.

To store associations of virtual circuits to physical paths and/or routes through a packet-switched communication network (e.g., the example packet-switched communication network 115 of FIG. 1), the example circuit manager 135 of FIG. 2 includes the example route database 215. The example route database 215 of FIG. 2 stores, for each virtual circuit, an ordered list of one or more nodes (e.g., switches) and/or communication paths via which data transported by and/or within the virtual circuit is to traverse the packet-switched network. Any number and/or type(s) of data structures may be used to implement the route database 215, and the route database 215 may be stored in any number and/or type(s) of memories and/or memory devices.

To provide routing data and/or information to nodes of a packet-switch network (e.g., the example switches 120A-D, 125A-D and/or 130A-B of FIG. 1), the example circuit manager 135 of FIG. 2 includes the example switch interface 220. Based on the routing information stored in the example route database 210, and using any suitable method(s), message(s), protocol(s) and/or data structure(s), the example switch interface 220 of FIG. 2 generates and/or provides routing tables to packet-switched network nodes. In general, a routing table defines how data received on a particular communication link for a particular virtual circuit is to be processed, routed and/or handled (e.g., transmitted on a given communication path, transmitted to a given switch, etc.). In some examples, routing tables provided to a particular switch are specific to that switch and/or only include routing information for those virtual circuits transported by and/or through the switch. In other examples, each switch is provided with an identical routing table. Any number and/or type(s) of data structures may be used to implement a routing table. In some examples, the implementation of a routing table is specific to a particular type and/or model of switch.

To receive data and/or information concerning actual usage, condition and/or performance of a packet-switched network (e.g., the example packet-switched network 115 of FIG. 1), the example circuit manager 135 of FIG. 2 includes a probe interface 225. Using any method(s), message(s), protocol(s) and/or data structures, the example probe interface 225 of FIG. 2 collects, receives, queries and/or otherwise obtains data and/or information collected by one or more SLA probes (e.g., the example SLA probes 140 of FIG. 1). In some examples, the example probe interface 225 periodically or aperiodically queries the SLA probes 140 for collected data and/or information. In addition, an aperiodic query may be performed in response to a trigger based on set threshold at interface 250. Additionally or alternatively, the SLA probes 140 autonomously send their collected data and/or information to the probe interface 225. The example probe interface 225 stores data and/or information received from the SLA probes 140 in a performance database 230.

To store data collected by SLA probes (e.g., the example SLA probes 140 of FIG. 1), the example circuit manager 135 of FIG. 2 includes the example performance database 230. The example performance database 230 of FIG. 2 stores current and/or historical data and/or information concerning bandwidth used by various applications, and/or the performance of communication paths and/or virtual circuits of one or more packet-switched networks (e.g., the example packet-switched network 115 of FIG. 1). Such current and/or historical data is collected by the SLA probes while the communication paths and/or virtual circuits are operating (e.g., are transporting user data). Example data structures that may be used to implement the example performance database 230 are described below in connection with FIGS. 4 and 5. The example performance database 230 of FIG. 2 may be stored in and/or implemented by any number and/or type(s) of memories and/or memory devices.

To analyze the data collected by the example probe interface 225, the example circuit manager 135 of FIG. 2 includes a usage analyzer 240. The example usage analyzer 240 of FIG. 2 processes data and/or information from the example performance database 230 to predict a daily "busy hour" for each virtual circuit and/or each application. As used herein, the term "daily busy hour" refers to the time-of-day at which usage of a particular virtual circuit is expected to peak. The example usage analyzer 240 can, additionally or alternatively, predict based on current and/or historical collected data the expected usage of virtual circuits for one or more different day parts. The example usage analyzer 240 averages corresponding records of the performance database 230 (e.g., a set of records corresponding to a selected day part for a particular virtual circuit over the past thirty days), to predict the usage for the selected day part for the virtual circuit. The usage analyzer 240 can, additionally or alternatively, average performance database 230 records to calculate an average packet-delivery-rate (PDR) value (e.g., representing the actual amount of useful and/or non-redundant information that is transmitted and/or processed from end-to-end across the network), a jitter value (e.g., representing the difference in delay between two packets and/or Ethernet frames) and/or a latency value (e.g., representing the amount of time necessary for a typical packet and/or Ethernet frame to traverse the network) for given day parts and/or given virtual circuits.

To calculate the cost for a virtual circuit, the example circuit manager 135 of FIG. 2 includes a cost analyzer 245. The example cost analyzer 245 of FIG. 2 analyzes current and/or historical data from the example performance database 230 to calculate a cost for a particular virtual circuit and/or communication path, and/or for a particular virtual circuit compared to an inter-nodal link (i.e., communication path) cost. A calculated virtual circuit cost is used by a rebalance triggerer 250 to determine when a rebalance of a packet-switched network (e.g., a reassignment of one or more virtual circuits to different communication paths) should occur, and/or to adjust one or more thresholds used to determine when a rebalance should occur. The example cost analyzer 245 uses a weighted combination of PDR, jitter, latency, etc. to compute a weighted cost of a virtual circuit and/or a communication path. For example, the cost analyzer 245 can compute a virtual circuit weighted cost using the following mathematical expression:

$$\text{Virtual Circuit Cost} = A*1/\text{PDR} + B*\text{Latency} + C*\text{Jitter}, \quad \text{EQN (1)}$$

where A, B and C are scale factors that adjust the relative contributions of PDR, Latency and Jitter.

To predict usage, the example circuit manager 135 of FIG. 2 includes a burst predictor 255. The example burst predictor 255 of FIG. 2 uses predicted usage values computed by the example usage analyzer 240 to predict communication path usage for an upcoming time period. At periodic and/or aperiodic intervals (e.g., every fifteen minutes), the example burst predictor 255 predicts the usage for an upcoming period (e.g., the next fifteen minute interval) for a given communication path by computing a sum of the predicted usage (for the upcoming period) of each virtual circuit currently assigned to the communication path. Predicted future usage values are provided by the burst predictor 255 to the example rebalance triggerer 250, which determines when rebalancing of a packet-switched network should be performed.

To determine when rebalancing of a packet-switched network should occur, the example circuit manager 135 of FIG. 2 includes the example rebalance triggerer 250. The example rebalance triggerer 250 of FIG. 2 compares weighted cost values computed by the cost analyzer 245 and/or predicted usage values computed by the burst predictor 255 with one or more thresholds to determine when rebalancing should occur. For example, when the weighted cost for a particular communication path exceeds a cost threshold, one or more of the virtual circuits transported via the communication path are reassigned by a rebalancer 260 to other communication paths to lower the cost of the communication path. Likewise, when the predicted usage of a communication path would exceed a usage threshold, one or more of the virtual circuits transported via the communication path are reassigned by the example rebalancer 260 to other communication paths to lower the cost of the communication path. As described below in connection with FIG. 8, the example rebalance triggerer 250 can also analyze the performance database 230 to identify applications having short-term usage behavior patterns indicative of increasing bandwidth requirements. When such application usage behavior is detected, the example rebalance triggerer 250 notifies the example rebalancer 260 that one or more virtual circuits need to be reassigned before the increasing application usage causes a degradation in network performance. By responding to both longer-term usage and weighted cost values computed based on historical data (e.g., over the past thirty days), and shorter-term application usage behavior (e.g., over the past hour), the example rebalance triggerer 250 and the example rebalancer 260 can flexibly and adaptively identify and/or respond to different network conditions while the network is operating.

To reassign virtual circuits to different physical communication links, the example circuit manager 135 of FIG. 2 includes the example rebalancer 260. When notified that rebalancing is to be performed for a particular communication path and/or a virtual circuit, the example rebalancer 260 of FIG. 2 identifies a lower cost and/or less utilized communication path to which one or more affected virtual circuits can be reassigned. In the illustrated example, the example rebalancer 260 moves an affected virtual circuit to the lowest cost and/or least utilized communication path capable of transporting the virtual circuits. However, other reassignment algorithms may be used. An example manner of implementing the example rebalancer 260 of FIG. 2 is described below in connection with FIG. 3.

The example rebalancer 260 of FIG. 2 also detects when reassignment of virtual circuits may not be sufficient to lower the cost and/or utilization of a packet-switched network. Such conditions may occur when insufficient transport capacity exists in the network to deal with a particular peak usage period. When such a condition is detected, the example rebalancer 260 notifies network planners and/or service technicians (e.g., via the example management interface 205) that additional capacity needs to be added and may, in some instances, identify where the additional capacity should be added. Because, the example circuit manager 135 of FIG. 2 measures and adaptively adjusts the routing of virtual circuits, the example circuit manager 135 substantially increases (compared to traditional virtual circuit routing algorithms)

the efficiency of packet-switched networks and substantially increases (compared to traditional virtual circuit routing algorithms) the time until additional capacity is needed.

While an example manner of implementing the circuit manager 135 of FIG. 1 has been illustrated in FIG. 2, one or more of the interfaces, data structures, elements, processes and/or devices illustrated in FIG. 2 may be combined, divided, rearranged, omitted, eliminated and/or implemented in any other way. Further, the example management interface 205, the example initial path selector 210, the example switch interface 220, the example probe interface 225, the example usage analyzer 240, the example cost analyzer 245, the example rebalance triggerer 250, the example burst predictor 255, the example rebalancer and/or, more generally, the circuit manager 135 may be implemented by hardware, software, firmware and/or any combination of hardware, software and/or firmware. Further still, the example circuit manager 135 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
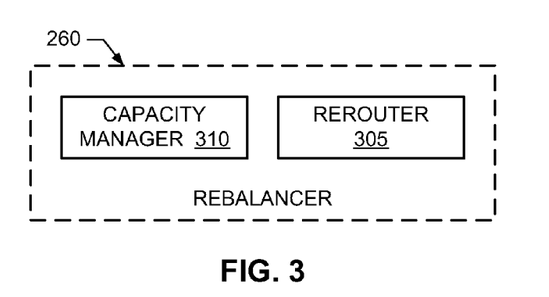
FIG. 3 illustrates an example manner of implementing the example rebalancer of FIG. 2.

FIG. 3 illustrates an example manner of implementing the example rebalancer 260 of FIG. 2. To reassign virtual circuits to different physical communication links, the example rebalancer 260 of FIG. 3 includes the example rerouter 305. When notified (e.g., by the example rebalance triggerer 250 of FIG. 2) that rebalancing is to be performed for a particular communication path and/or a virtual circuit, the example rerouter 305 of FIG. 3 identifies a lower cost and/or less utilized communication path to which one or more affected virtual circuits can be reassigned. The example rerouter 305 of FIG. 3 moves an affected virtual circuit to the lowest cost and/or least utilized communication path capable of transporting the virtual circuits. However, other reassignment algorithms may be used.

To detect when rerouting may be insufficient to properly control costs and/or network utilizations, the example rebalancer 260 of FIG. 3 includes a capacity manager 310. The example capacity manager 310 of FIG. 3 compares current cost and/or utilization values with network design guidelines. When current cost and/or utilization values cannot be kept below the network design guidelines, the example capacity manager 310 notifies network planners and/or service technicians (e.g., via the example management interface 205 of FIG. 2) that additional capacity needs to be added and may, in some instances, identify where the additional capacity should be added.

While an example manner of implementing the rebalancer 260 of FIG. 2 has been illustrated in FIG. 3, one or more of the interfaces, data structures, elements, processes and/or devices illustrated in FIG. 3 may be combined, divided, rearranged, omitted, eliminated and/or implemented in any other way. Further, the example rerouter 305, the example capacity manager 310 and/or, more generally, the rebalancer 260 may be implemented by hardware, software, firmware and/or any combination of hardware, software and/or firmware. Further still, the example rebalancer 260 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
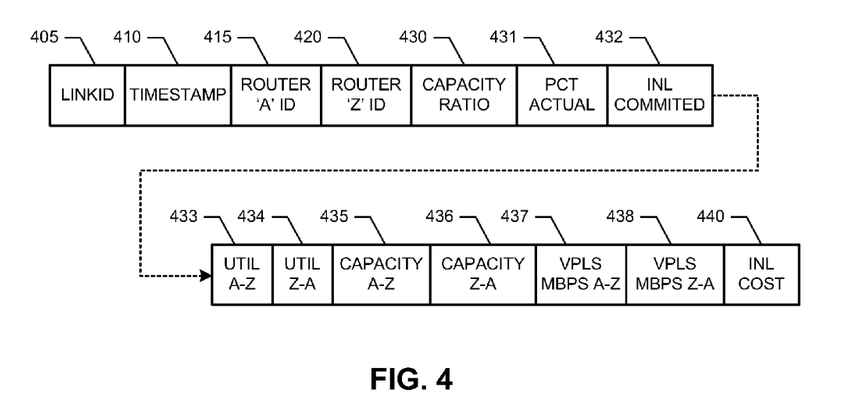
FIGS. 4 and 5 illustrate example data structure records that may be used to implement the example performance database of FIG. 2.
Figure 5:
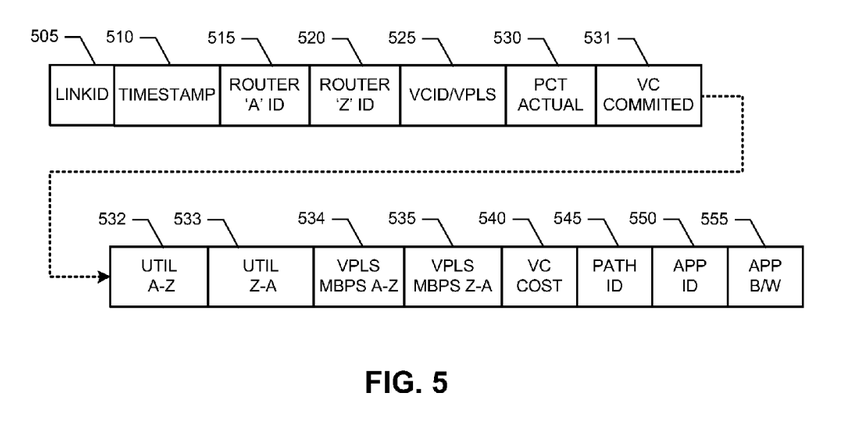

FIGS. 4 and 5 illustrate example data structures records that may be used to implement the example performance database 230 of FIG. 2. The example data structure record of FIG. 4 contains data and/or information representing the weighted cost and/or usage of an inter-nodal link (INL) (i.e., a physical communication path) during a particular time period (e.g., a fifteen minute time period on a certain day of the week). The example data structure record of FIG. 5 contains data and/or information representing the weighted cost and/or usage of a virtual circuit during a particular time period (e.g., over a time period such as a fifteen minute time period). The example data structure records of FIGS. 4 and 5 are generated by nodes and/or switches of a packet-switched network (e.g., the example SLA probes 140 of FIG. 1). As data packets and/or Ethernet frames pass through the packet-switched network, the SLA probes collect data (e.g., over fifteen minutes) and aggregate the data to generate the example data structure records of FIGS. 4 and/or 5. The example performance database 230 of FIG. 2 contains one or more of the example data structure records of FIGS. 4 and 5 corresponding to one or more INLs, virtual circuits, and/or time periods. For example, the performance database 230 contains records for the most recent thirty day period, with each record representing data for a particular fifteen minute interval of a particular day for a particular virtual circuit and/or INL.

To identify the INL, the example data structure record of FIG. 4 includes a LINKID field 405. The example LINKID field 405 of FIG. 4 includes an alphanumeric string that identifies a particular physical communication path. To identify a time period, the example data structure record of FIG. 4 includes a timestamp field 410. The example timestamp field 410 of FIG. 4 includes one or more values that identify the time period represented by the data structure record. To identify the routers (e.g., switches) on the ends of the identified INL, the example data structure record of FIG. 4 includes a ROUTER 'A' ID field 415 and a ROUTER 'Z' ID field 420. The example fields 415 and 420 contain alphanumeric strings that identify a router.

To store information concerning utilization of the INL, the example data structure record of FIG. 4 includes fields 430-438. The example capacity ratio field 430 of FIG. 4 contains a value representative of the ratio of used capacity of the INL to the provisioned capacity of the INL. The example PCT actual field 431 of FIG. 4 contains a value representative of the ratio of utilized capacity to provisioned capacity as a percentage. The example INL committed field 432 of FIG. 4 contains a value representative of the committed capacity of the INL. The example Utilization (Util) A-Z field 433 of FIG. 4 contains a value representative of the total combined virtual circuit capacity utilization from router 'A' to router 'Z.' The example Util Z-A field 434 of FIG. 4 contains a value representative of the total combined virtual circuit capacity utilization from router 'Z' to router 'A.' The example Capacity A-Z field 435 of FIG. 4 contains a value representative of the circuit topology, point-to-point aggregated capacity from router 'A' to router 'Z.' The example Capacity Z-A field 436 of FIG. 4 contains a value representative of the circuit-topology, point-to-point aggregated capacity from router 'Z' to router 'A.' The example VPLS million bits-per-second (MBPS) A-Z field 437 of FIG. 4 contains a value representative of the circuit-topology, point-to-multipoint aggregated capacity from router 'A' to router 'Z.' The example VPLS MBPS Z-A field 438 of FIG. 4 contains a value representative of the circuit-topology, point-to-multipoint aggregated capacity from router 'Z' to router 'A.'

To store the cost of the INL, the example data structure record of FIG. 4 contains an INL cost field 440. The example INL cost field 440 of FIG. 4 contains a value representative of the computed cost of the INL.

Turning now to the example data structure record of FIG. 5 for a virtual circuit. To identify the INL transporting a particular virtual circuit, the example data structure record of FIG. 5 includes a LINKID field 505. The example LINKID field 505 of FIG. 5 includes an alphanumeric string that identifies a particular physical communication path. To identify a time period, the example data structure record of FIG. 5 includes a timestamp field 510. The example timestamp field 510 of FIG. 5 includes one or more values that identify the time period represented by the data structure record. To identify the routers (e.g., switches) on the ends of the identified INL, the example data structure record of FIG. 5 includes a ROUTER 'A' ID field 515 and a ROUTER 'Z' ID field 520. The example fields 515 and 520 contain alphanumeric strings that identify corresponding routers. To identify the virtual circuit, the example data structure of FIG. 5 includes a virtual circuit ID field 525. The example virtual circuit ID field 525 of FIG. 5 contains an alphanumeric string that identifies a particular virtual circuit.

To store information concerning utilization of the virtual circuit, the example data structure record of FIG. 5 includes fields 530-535. The example PCT actual field 530 of FIG. 5 contains a value representative of the ratio of utilized capacity of the virtual circuit to provisioned capacity of the virtual circuit as a percentage. The example VC committed field 531 of FIG. 5 contains a value representative of the committed capacity of the virtual capacity. The example Util A-Z field 532 of FIG. 5 contains a value representative of the circuit topology, point-to-point virtual circuit utilization from router 'A' to router 'Z.' The example Util Z-A field 533 of FIG. 5 contains a value representative of the circuit-topology, point-to-point virtual circuit utilization from router 'Z' to router 'A.' The example VPLS MBPS A-Z field 534 of FIG. 5 contains a value representative of the circuit-topology, point-to-multi-point virtual circuit utilization from router 'A' to router 'Z.' The example VPLS MBPS Z-A field 535 of FIG. 5 contains a value representative of the circuit-topology, point-to-multi-point virtual circuit utilization from router 'Z' to router 'A.'

To store the cost of the virtual circuit, the example data structure record of FIG. 5 contains a VC cost field 540. The example VC cost field 540 of FIG. 5 contains a value representative of the computed cost of the INL. To identify the path taken by the virtual circuit, the example data structure record of FIG. 4 contain a path ID field 545. The example path ID field 545 of FIG. 5 contains a number identify a communication path through a packet-switched network.

To identify an application, the example data structure record of FIG. 5 includes an application ID field 550. The example application ID field 550 of FIG. 5 contains a number to identify a particular application and/or application type (e.g., a video conference application). To store the bandwidth utilized by the application, the example data structure record of FIG. 5 includes an application bandwidth field 555. The example application bandwidth field 555 of FIG. 5 contains a value that represents the bandwidth used by the application.

While example data structure records are illustrated in FIGS. 4 and 5, the example data structure records may be implemented using any number and/or type(s) of other and/or additional fields and/or data. Further, the fields and/or data illustrated in FIGS. 4 and 5 may be combined, divided, rearranged, eliminated and/or implemented in any desired manner. Moreover, the example data structure records may include fields and/or data in addition to, or instead of, those illustrated in FIGS. 4 and/or 5, and/or may include more than one of any or all of the illustrated fields and/or data.

Figure 6:
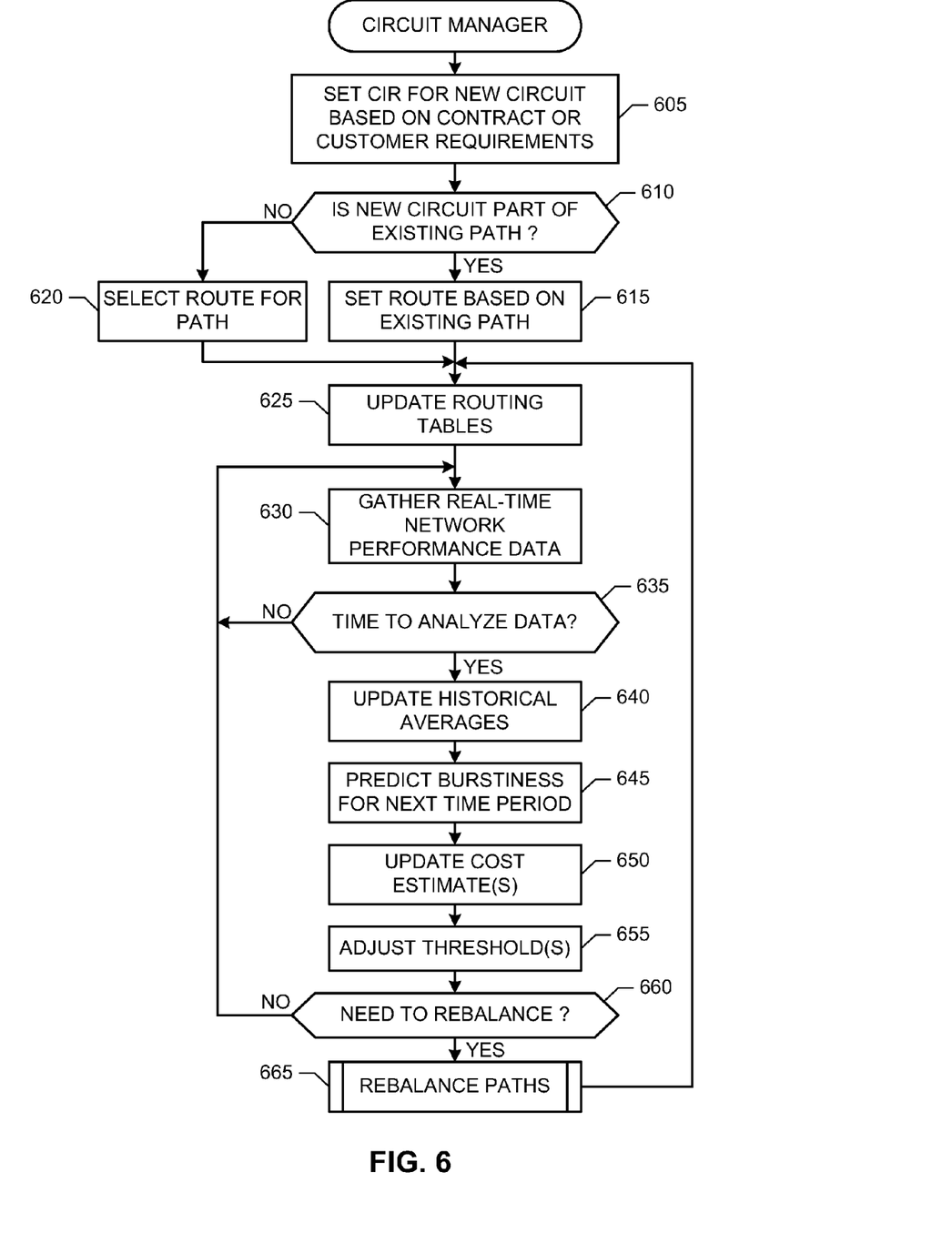
FIG. 6 is a flowchart representative of example machine accessible instructions that may be executed to implement any or all of the example circuit managers of FIGS. 1 and/or 2.
Figure 7:
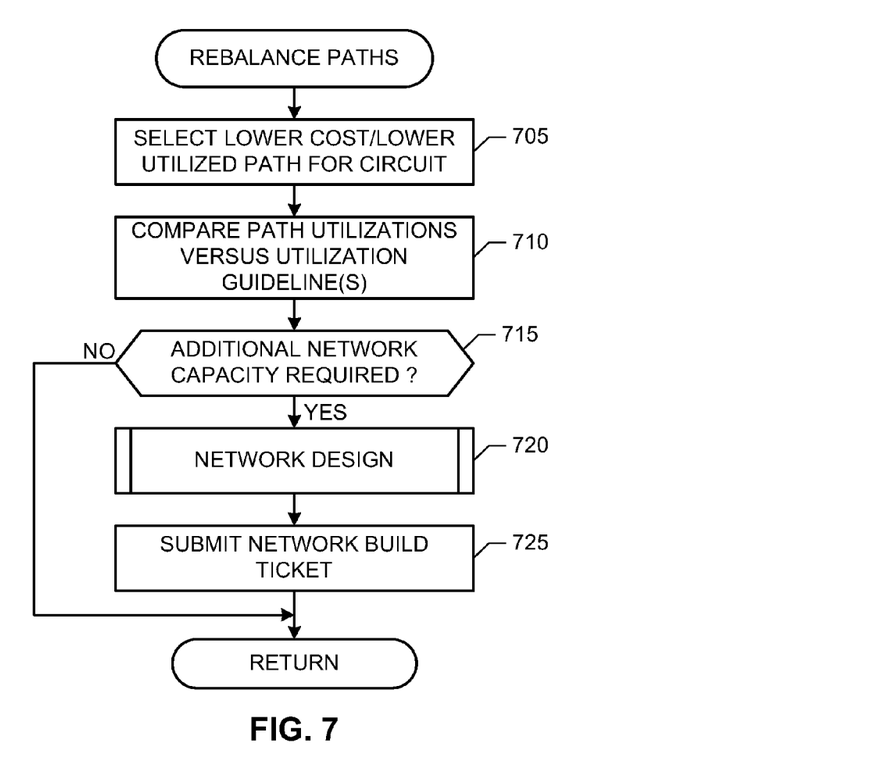
FIG. 7 is a flowchart representative of example machine accessible instructions that may be executed to implement any or all of the example rebalancers of FIGS. 2 and/or 3.

FIG. 6 illustrates example machine accessible instructions that may be executed to implement any or all of the example circuit managers 135 of FIGS. 1 and/or 2. FIG. 7 illustrates example machine accessible instructions that may be executed to implement any or all of the example rebalancers 260 of FIGS. 2 and/or 3. The example machine accessible instructions of FIGS. 6 and/or 7 may be carried out by a processor, a controller and/or any other suitable processing device. For example, the example machine accessible instructions of FIGS. 6 and/or 7 may be embodied in coded instructions stored on a tangible medium such as a flash memory, a read-only memory (ROM) and/or random-access memory (RAM) associated with a processor (e.g., the example processor 905 discussed below in connection with FIG. 9). Alternatively, some or all of the example machine accessible instructions of FIGS. 6 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIGS. 6 and/or 7 may be implemented manually or as any combination of any of the foregoing techniques, for example, any combination of firmware, software, discrete logic and/or hardware. Further, although the example machine accessible instructions are described with reference to the flowcharts of FIGS. 6 and/7, persons of ordinary skill in the art will readily appreciate that many other methods of implementing the machine accessible instructions of FIGS. 6 and 7 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 6 and/or 7 may be carried out sequentially and/or carried out in parallel by, for example, separate processing threads, processors, devices, discrete logic, circuits, etc.

The example machine accessible instructions of FIG. 6 begin when a circuit manager (e.g., any of the example circuit managers 135 of FIGS. 1 and/or 2) is notified that a new virtual circuit is to be added. If a new virtual circuit is not being added, then the example machine accessible instructions of FIG. 6 can begin at block 630. The circuit manager sets the committed information rate (CIR) value for a new virtual circuit based on contract and/or customer requirements (block 605). If the new virtual circuit is part of any existing communication path (block 610), the circuit manager (e.g., the example initial path selector 210 of FIG. 2) selects an initial route for the virtual circuit based on the encompassing communication path (block 615). If the new virtual circuit is not part of an existing communication path (block 610), the initial path selector selects an initial route for the virtual circuit using, for example, a round-robin route selection algorithm (block 620).

Once an initial route for the new virtual circuit has been selected, the circuit manager (e.g., the example switch interface 220 of FIG. 2) updates and distributes routing tables (block 625). The circuit manager (e.g., the example probe interface 225) collects information regarding the real-time performance of the network (block 630). If the time to analyze performance data has not arrived (block 635), control returns to block 630 to continue collecting data.

When collected performance data is to be analyzed (e.g., every fifteen minutes) (block 635), the circuit manager (e.g., the example usage analyzer 240 of FIG. 4) updates historical averages of virtual circuit and/or INL usage (block 640). The circuit manager (e.g., the example burst predictor 255) predicts the usage of the packet-switched network for the next time interval (e.g., for the next fifteen minutes) (block 645). The circuit manager (e.g., the example cost analyzer 245) then updates cost estimates (block 650).

The circuit manager (e.g., the example rebalance triggerer 250 of FIG. 2) adjusts, if necessary, one or more rebalance triggers (block 655) and determines whether the packet-switched network needs to be rebalanced (block 660). If the network does not need to be rebalanced (block 660), control returns to block 630 to continue collecting data.

If the network needs to be rebalanced (block 660), the circuit manager (e.g., the example rebalancer 260 of FIG. 2) rebalances one or more virtual circuits and/or communication paths by, for example, executing the example machine accessible instructions of FIG. 7 (block 665). When the network has been rebalanced (block 665), control returns to block 625 to update the routing tables and continuing collecting data.

The example machine accessible instructions of FIG. 7 may be executed to reassign one or more virtual circuits to different communication paths. The example machine accessible instructions of FIG. 7 begin, for example, when called by the example machine accessible instructions of FIG. 6 at block 665. A rebalancer (e.g., the example rebalancer 260 and/or, more specifically, the example rerouter 305 of FIGS. 2 and/or 3) selects a lower cost and/or lower utilized path for the virtual circuit and reassigns the virtual circuit to the selected path (block 705).

The rebalancer (e.g., the example capacity manager 310 of FIG. 3) compares the utilizations of one or more paths with one or more network design criteria (block 710). If the comparisons indicate that no additional network capacity is needed (block 715), control exits from the example machine accessible instructions of FIG. 7.

If the comparisons indicate that additional capacity should be added to the network (block 715), the capacity manager carries out one or more suitable network design algorithms to identify where the additional capacity should be added (block 720). The capacity manager then generates a network build ticket (block 725). Control then exits from the example machine accessible instructions of FIG. 7.

Figure 8:
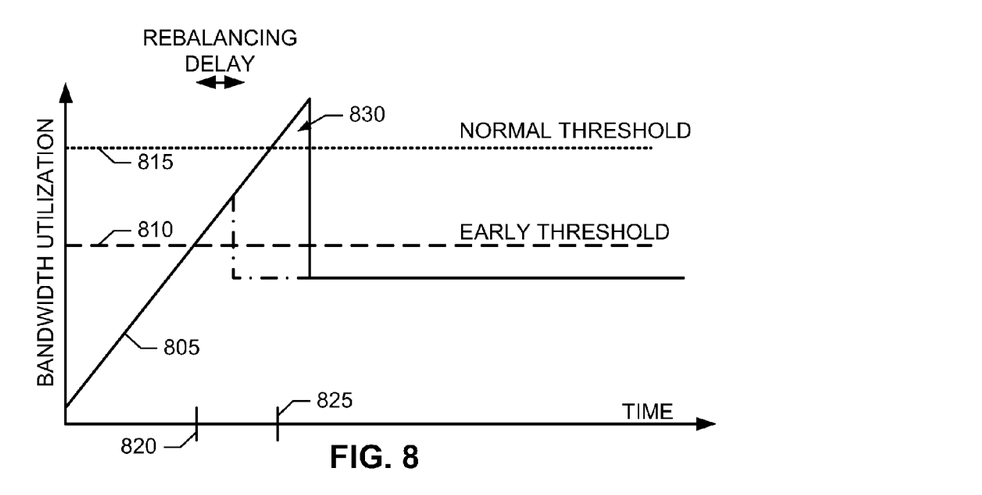
FIG. 8 illustrates an example trajectory-based rebalancing trigger.

FIG. 8 illustrates an example illustrates an example trajectory-based rebalancing trigger that may be implemented by the example rebalance triggerer 250 of FIG. 2. In the illustrated example of FIG. 8, data has been collected (e.g., by the example SLA probes 140 of FIG. 1) allowing the rebalance triggerer 250 to determine that a particular application has an increasing bandwidth utilization 805. When the rebalance triggerer 250 detects the increasing bandwidth utilization 805 (e.g., when the rate of change of the bandwidth utilization 805 exceeds a threshold), the rebalance triggerer 250 adjusts a rebalance trigger threshold to a lower value 810 than the normal rebalance trigger threshold 815. Because the rebalance trigger threshold was lowered, the virtual circuit transporting the application is rebalanced at time 820 rather than at time 825 thereby reducing the likelihood that data packets 830 may be lost and/or affected before a rebalancing of the virtual circuit could have been affected.

Figure 9:
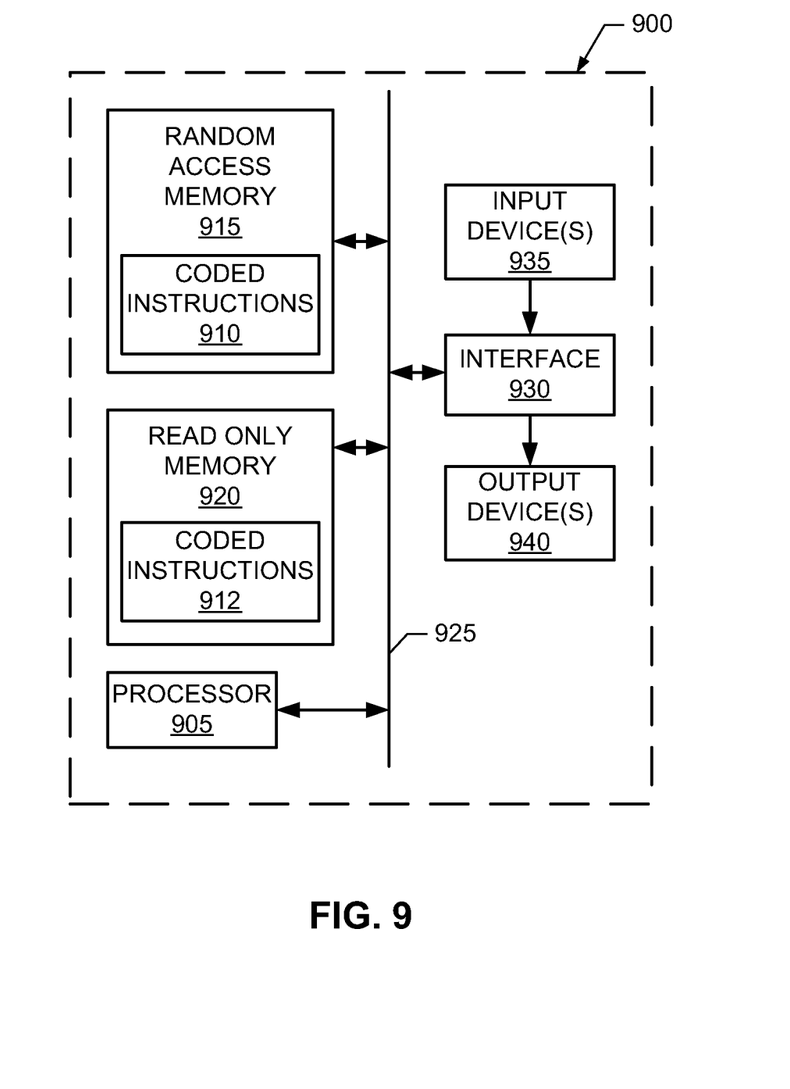
FIG. 9 is a schematic illustration of an example processor platform that may be used and/or programmed to carry out the example machine accessible instructions of FIGS. 6 and/or 7 to implement any of all of the example methods and apparatus described herein.

FIG. 9 is a schematic diagram of an example processor platform 900 that may be used and/or programmed to implement all or a portion of any or all of the example circuit managers 135 and/or the example rebalancers 260 of FIGS. 1-3. For example, the processor platform 900 can be implemented by one or more general purpose processors, processor cores, microcontrollers, etc.

The processor platform 900 of the example of FIG. 9 includes at least one general purpose programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIGS. 6 and/or 7 to implement the example methods and apparatus described herein.

The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown). The memory 915 and/or 920 may be used to implement the example route database 215 and/or the example performance database 230 of FIG. 2.

The processor platform 900 also includes an interface circuit 930. The interface circuit 930 may be implemented by any type of interface standard, such as an external memory interface, serial port, general purpose input/output, etc. One or more input devices 935 and one or more output devices 940 are connected to the interface circuit 930. The input devices 935 and/or output devices 940 may be used to, for example, implement the example management interface 205, the example switch interface 220 and/or the example probe interface 225 of FIG. 2.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other rewritable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A circuit manager comprising:
a usage analyzer to estimate a utilization of a network for a future time interval based on data associated with actual utilization of the network;
a rebalancer to detect a trigger event based on the estimated utilization, and to identify a future virtual circuit path through the network for the future time interval based on the estimated utilization when the trigger event is detected, the usage analyzer and the rebalancer to repetitively change mapping of virtual circuit paths including the future virtual circuit path to physical resources to adapt the network to expected usage conditions;
a rerouter to identify the future virtual circuit path based on a first predicted weighted cost for a first communication link and a second predicted weighted cost for a second communication link; and
a capacity manager to determine whether the identified future virtual circuit path is expected to reduce a future utilization of a communication path below a first threshold, and to determine where additional transmission capacity should be added to the network when the predicted future utilization of the communication path exceeds the first threshold.

2. A circuit manager as described in claim 1, further comprising a cost analyzer to determine a weighted cost associated with a current virtual circuit path, wherein the trigger event comprises the weighted cost exceeding a second threshold.

3. A circuit manager as described in claim 1, further comprising a burst predictor to predict an amount of data to be transported during the future time interval, wherein the trigger event comprises the predicted amount of data exceeding a second threshold.

4. A circuit manager as described in claim 1, further comprising a switch interface to provide the future virtual circuit path to a network switch to implement the future virtual circuit path.

5. A circuit manager as described in claim 1, wherein the data comprises a burstiness.

6. A circuit manager as described in claim 1, wherein the mapping of the virtual circuit paths to the physical resources is changed to reduce a weighted cost associated with the future virtual circuit path.

7. A circuit manager as described in claim 1, wherein the mapping of the virtual circuit paths to the physical resources is changed to reduce a utilization of a communication link assigned to transport the future virtual circuit path.

8. A method of adapting a network to handle predicted traffic, the method comprising:

in response to detecting a trigger event, estimating a first utilization of a network for a future time interval based on first data associated with first actual utilization of the network;
mapping a future virtual circuit path to a first physical resource through the network for the future time interval and re-mapping an existing virtual circuit path from a second physical resource to a third physical resource based on the first estimated utilization, the future virtual circuit path based on a first predicted weighted cost for a first communication link and a second predicted weighted cost for a second communication link;
determining whether the future virtual circuit path is expected to reduce a future utilization of a communication path below a first threshold, and to determine where additional transmission capacity should be added to the network when the predicted future utilization of the communication path satisfies the first threshold; and
storing the future virtual circuit path in a routing table.

9. A method as described in claim 8, wherein the trigger event comprises expiration of a timer.

10. A method as described in claim 8, wherein the trigger event occurs periodically.

11. A method as described in claim 8, wherein the trigger event comprises a communication link having a load exceeding a second threshold.

12. A method as described in claim 8, wherein the trigger event comprises a communication link having a weighted cost exceeding a second threshold.

13. A method as described in claim 8, wherein the trigger event comprises an application bandwidth exceeding a second threshold, the second threshold to be adjusted when a rate of increase of the application bandwidth exceeds a third threshold.

14. A method as described in claim 8, wherein the trigger event comprises a predicted virtual circuit path having a weighted cost exceeding a service level agreement threshold.

15. A tangible machine readable storage device comprising instructions which, when executed, cause a machine to perform operations comprising:
in response to detecting a trigger event, estimating a utilization of a network for a future time interval based on data associated with actual utilization of the network;
identifying a future virtual circuit path through the network for the future time interval based on the estimated utilization;
storing the future virtual circuit path in a routing table;
remapping an existing virtual circuit path from a first communication link to a second communication link based on the estimated utilization, the future virtual circuit path based on a first predicted weighted cost for a first communication link and a second predicted weighted cost for a second communication link;
determining whether the future virtual circuit path is expected to reduce a future utilization of a communication path below a first threshold, and to determine where additional transmission capacity should be added to the network when the predicted future utilization of the communication path exceeds the first threshold; and
storing the remap of the existing virtual circuit path in the routing table.

16. A tangible machine readable storage device as defined in claim 15, wherein the trigger event comprises the first communication link having a load exceeding a second threshold.

17. A tangible machine readable storage device as defined in claim 15, wherein the trigger event comprises the first communication link having a weighted cost exceeding a second threshold.

18. A tangible machine readable storage device as defined in claim 15, wherein the trigger event comprises an application bandwidth exceeding a second threshold, the second threshold to be adjusted when a rate of increase of the application bandwidth exceeds a third threshold.

19. A tangible machine readable storage device as defined in claim 15, wherein the trigger event comprises a predicted virtual circuit path having a weighted cost exceeding a service level agreement threshold.

20. A tangible machine readable storage device as defined in claim 15, wherein the instructions, when executed, cause the machine to provide the routing table to a network switch to implement the future virtual circuit path.

* * * * *